United States Patent [19]

DeCoste, Jr.

[11] Patent Number: 4,992,331

[45] Date of Patent: Feb. 12, 1991

[54] NOVEL CONFORMABLE ADHESIVE TAPE

[75] Inventor: Leonard D. DeCoste, Jr., Stoneham, Mass.

[73] Assignee: The Kendall Company, Lexington, Mass.

[21] Appl. No.: 252,092

[22] Filed: Sep. 30, 1988

[51] Int. Cl.$^5$ .................. B32B 7/12; B32B 15/04
[52] U.S. Cl. .................. 428/354; 428/343; 428/353; 428/216; 428/252
[58] Field of Search .................. 428/353, 354, 343

[56] References Cited

U.S. PATENT DOCUMENTS

| | | | |
|---|---|---|---|
| 3,560,247 | 2/1971 | Robinson | 428/353 X |
| 3,592,682 | 7/1971 | Weiner et al. | 428/353 X |
| 3,853,598 | 12/1974 | Raguse | 428/354 X |
| 4,303,724 | 12/1981 | Sergeant et al. | 428/343 X |
| 4,346,700 | 8/1982 | Dunshee et al. | 128/155 X |

FOREIGN PATENT DOCUMENTS 51-037935  9/1974  Japan .................. 428/353

Primary Examiner—George F. Lesmes
Assistant Examiner—D. R. Zirker
Attorney, Agent, or Firm—M. Maus; A. Isaacs

[57] ABSTRACT

Novel flame-retardant conformable adhesive tapes consisting essentially of: (1) a water-impermeable chlorinated polyethylene backing layer from about 1 to 3 mils thick; (2) an evenly tearable synthetic fiber cloth or scrim; (3) a flame-retardant adhesive layer, preferably a rubber-based adhesive; and (4) a thin tie coat layer between the backing and the scrim which, when applied as a molten mass, at least partially fills the interstices between the fibers of the scrim so as to provide surface contact with the underlying adhesive layer, the tie coat providing a strong bond at both the tie coat/backing interface and the tie coat/scrim and adhesive interfaces, thereby providing a laminar product possessing the desired anchorage and structural stability and integrity.

The tape is particularly useful in wrapping irregular surfaces, e.g. as a wire harness wrap, where high conformability is essential to good adhesive contact.

12 Claims, No Drawings

NOVEL CONFORMABLE ADHESIVE TAPE

BACKGROUND OF THE INVENTION

Ser. No. 79,183 filed July 29, 1987 now abandoned in the name of Abboud Mamish and assigned to The Kendall Company, assignee of the present invention discloses conformable flame-retardant pressure-sensitive adhesive tapes that are particularly useful in wrapping irregular surfaces, e.g. wire harness wraps where conformability is essential to good adhesive contact.

In general, industrial adhesive tapes of the type known as duct tapes consist of a pliable film base, e.g. a polyolefin; a reinforcing fabric or scrim of cotton or a synthetic fiber, and an adhesive layer, e.g. a rubber-based adhesive coating.

Particularly efficacious tapes of this general description are described and claimed in U.S. Pat. No. 4,303,724 issued to Sergeant and Thomas and assigned to The Kendall Company, assignee of the present invention. In accordance with their patent, the tear characteristics of such tapes having low-count reinforcing fabrics is greatly improved if the fabric comprises texturized or "false-twist" yarns in the filling direction. For instance, in the Specific Embodiment of the invention in Col. 2, a gauze fabric was constructed using 20 yarns per inch of cotton in the warp (machine direction) and 12 false twist polyester yarns in the filling (cross) direction. When torn by hand, the tear properties of the tape imparted by the 20×12 fabric achieved an even tear previously attainable only by the use of appreciably higher count fabrics.

In the tape described in the specific embodiment, the film backing was a low density polyethylene (LDPE) 4 mils thick and the adhesive, a rubber-based adhesive, was 6 mils thick. These recited thicknesses for the film backing and adhesive coating are fairly illustrative of the thicknesses generally utilized for duct tapes.

While tapes of such thicknesses are of course quite satisfactory in terms of flexibility for their intended usage, e.g. as duct tapes, they lack the flexibility and conformability for wrapping smaller objects, particularly smaller objects of irregular shape.

Broadly speaking, the invention described in the aforementioned application is directed to industrial adhesive tapes which have a reinforcing fabric scrim for increased strength and dimensional stability but yet possess the conformability for use as a protective wrap for irregularly shaped articles. The scrim also facilities even tearing in the cross direction. More specifically, it relates to an adhesive tape of this description which possesses the physical properties required for use as a harness wrap, for wire splices and other such industrial applications. For such industrial applications, the tape should be low cost, liquid impermeable, chemical resistant, flame retardant, non-corrosive and evenly tearable in the cross direction (CD) as well as being conformable so as to adhere to the irregular contours of the article to be wrapped. This combination of requirements for the intended industrial applications in turn present several obstacles which must be overcome in order to provide the desired tape.

With respect to the reinforcing fabric, synthetic fibers such as polyesters as a class have the requisite qualities and are also of acceptable low cost. However, suffer the disadvantage of possessing poor anchorage to polymeric backings or other polymeric substrates. Consequently, when the thickness of the backing layer (e.g. polyethylene) is reduced in any effort to achieve the desired conformability which may be obtained by employing thinner films, the anchorage of the scrim to the backing drops. The resulting product accordingly lacks the structurable stability for marketability. Cotton fibers on the other hand, may provide acceptable anchorage to such a thinner backing. However, they are quite flammable and consequently must be treated with a flame retardant and, moreover, are more expensive. For these reasons, cotton scrims cannot be employed in accordance with this invention and it is therefore necessary to employ synthetic fiber scrims in the preparation of the thin, conformable tapes envisioned by the present invention. This in turn requires some way to provide the acceptable anchorage which is not inherent in the use of synthetic fiber scrims with thin backings.

The task of the invention in the aforementioned Ser. No. 79,183, simply stated, may be said to be to solve these problems so as to provide an adhesive tape having the described properties and which maybe used, for example, by the automotive industry for harness wraps.

As is disclosed in the copending application, Ser. No. 79,183, the task is solved by providing an adhesive tape comprising: (1) a water-impermeable backing layer, e.g. low-density polyethylene (LDPE), on the order of 1-3 mils thick containing a flame-retardant; (2) an evenly tearable synthetic fiber scrim; (3) a flame retardant adhesive layer, preferably a rubber-based adhesive; and (4) a tie coat layer between the backing and the scrim which, when applied, at least partially fills the interstices between fibers of the scrim so as to provide surface contact with the underlying adhesive layer, the tie coat providing a strong bond at both the tie coat-backing interface and the tie coat-adhesive and scrim interfaces, thereby providing a laminar product possessing the desired anchorage and structural stability.

In the preferred embodiment of the invention, the tape is provided by coextruding the backing material and tie coat onto the scrim and thereafter applying the adhesive coating.

The task of the present invention may be said to be two-fold, namely: (1) to provide still greater conformability for the contemplated usage; and (2) to eliminate or at least materially reduce the amount of flame retardant which need be put in the backing layer for uses where optimum flame retardancy is an essential property of the adhesive tape.

BRIEF DESCRIPTION OF THE INVENTION

In accordance with the present invention, this task is solved by substituting chlorinated polyethylene (hereinafter "CPE") for the backing materials with flame-retardant disclosed in the aforementioned Ser. No. 79,183.

DETAILED DESCRIPTION OF THE INVENTION

As previously stated, the present invention is directed to industrial adhesive tapes which have a reinforcing woven or nonwoven scrim and which possess a high degree of conformability making them suitable for use in wrapping irregularly shaped smaller articles, e.g. as a harness wrap, and which additionally are flame retardant and finger tearable in the cross direction. In order to have the requisite conformability, it is necessary that they be significantly thinner than a conventional industrial tape, e.g. a duct tape such as is described in the aforementioned patent. However synthetic fiber scrims which are quite suitable for use in the contemplated products typically have poor anchorage and consequently when the backing is made thinner, the resulting tape lacks commercially acceptable structural stability.

In accordance with the present invention, this problem is solved and the desired conformable tape is provided by utilizing a tie coat layer between a CPE backing and the scrim which when applied partially fills the interstices between fibers of the scrim so as to provide surface contact with the underlying adhesive layer, the tie coat being of a material which provides a good bond at both the tie coat/backing interface and tie coat/adhesive interface, thereby providing a laminar product possessing the desired anchorage and structural stability.

The novel tape of this invention will accordingly be characterized by being thin and conformable pressure-sensitive adhesive tapes having; in order, the following essential layers or components:

(1) a water-impermeable chlorinated polyethylene backing layer 1-3 mils thick;

(2) a thin tie coat layer, preferably on the order of 0.25 to 1.0 mil thick, providing a good bond at the interface between the inner surface of the backing layer and the underlying scrim and adhesive layer;

(3) a lightweight synthetic fiber scrim; and (4) a flame-retardant pressure-sensitive adhesive layer no thicker than about 4 mils.

With the exception of employing a chlorinated polyethylene to form the backing layer, an adhesive tape of the foregoing description will be essentially the same as those described and claimed in the aforementioned copending application, Serial No. 79,183. The essence of the present invention, accordingly, is providing a backing layer consisting essentially of a chlorinated polyethylene.

The use of a chlorinated polyethylene in the aforementioned tapes has been found to provide two significant advantages over the tapes disclosed in the copending application: (1) a still greater tape conformability, a critical requirement for wrapping many of the contemplated irregularly shaped articles; and (2) inherent flame retardance due to the chlorine substituent.

Chlorinated polyethylene (CPE's) are per se known in the art and useful CPE's are commercially available, for example, from Dow Chemical.

Various references to the use of CPE's are found in the patent literature. By way of illustration, U.S. Pat. No. 4,346,700 issued to Dunshee et al Aug. 31, 1982 discloses pressure-sensitive sheet materials such as tapes and surgical drapes that are skin and joint conformable and comprise a backing consisting of CPE. As is disclosed therein, it is important that these products exhibit conformability and extensibility similar to skin to minimize negative effects on skin, e.g. after surgery. In accordance with the patent teachings, the backing sheet will consist essentially of CPE and will preferably be a blend of 50-100% CPE and from 0-50% by weight polymeric extenders. The preferred CPE is said to be a linear high density CPE containing 35-55% by weight of chlorine. The polymeric extenders to be employed are said to be those polymeric materials which have a higher modulus of elasticity than the CPE so as to increase the ability to resist deformation when subjected to stress. Among the disclosed extenders, low density polyethylene is said to be preferred.

CPE's are also described in various publications other than the patent literature. For a detailed description of CPE's, including their preparation and properties, reference may be had to "Encyclopedia of Polymer Science and Engineering", Vol. 6, pp 495-511 (1986), published by John Wiley & Sons, which publication is incorporated by reference herein. On pp 501-502 of this publication, the burning characteristics are discussed. As stated therein, the chlorine in CPE confers resistance to ignition, which can be greatly increased by the addition of flame retardant synergists. Useful disclosed flame retardant synergists are: Firebrake ZB, tricresyl phosphate, triphenyl phosphate, tetrabromophthalic anhydride, hexabromobenzene, antimony oxide, and Firebrake ZB+tetrabromophthalic anhydride.

In accordance with the present invention the backing material will consist essentially of from 80 to 100% CPE and from 0-20% by weight of a polyolefinic material such as polyethylene, e.g. low density polyethylene. Preferably, the CPE will contain on the order of from about 40 to about 60% by weight chlorine.

While not essential to the practice of this invention, it may also contain other per se known ingredients to perform specific desired functions, e.g. a heat stabilizer such as barium-cadmium, lead or the others disclosed on pp 503-4 of the aforementioned "Encyclopedia of Polymer Science and Engineering" publication; antioxidants such as the known hindered amine antioxidants; colorants such as carbon black, etc.

As is disclosed in the aforementioned copending application, Ser. No. 79,183, the tie coat will be selected to provide a good bond with all of the substrates of the tape (including the adhesive layer, a portion of which will be present in the interstices of the scrim) so as to provide a laminar product providing the requisite stability against delamination or separation. Particularly useful materials of this description are polyolefin copolymers, particularly polyethylene copolymers such as ethylene methyl acrylate, ethylene vinyl acetate, ethylene acrylic acid, etc. Other useful tie coat materials may be readily suggested to those skilled in the art in the light of this description.

The scrim employed in the practice of this invention will comprise a synthetic fiber woven cloth, preferably polyester. However, it is not necessary for all the fibers to be synthetic and the preferred cloths will in fact contain up to 50% cotton in the warp direction in order to facilitate evenness in finger tearability without sacrificing flame retardancy.

The preferred cloths are of the type described in the aforementioned U.S. Pat. No. 4,303,724 having polyester false-twist or texturized yarns in the filling direction. As previously stated, the warp yarn may and preferably will be a blend of cotton and polyester. For instance, a tape made in accordance wit this invention employing a woven cloth of the foregoing description having a 75-25 polyester/cotton blend in the warp permitted satisfactory finger tearability in the cross direction. However, slightly improved tearability was obtained with a 50-50 polyester/cotton warp blend. In any case, the preferred fabrics will contain no more than twenty texturized (false twist) yarns per inch in the filling direction; and no more than 35 yarns per inch in the warp.

Accordingly, as used herein and in the appended claims the phrase "woven cloth comprising a synthetic fiber" or "woven cloth comprising polyester" denotes a woven cloth in which the yarn in this filling direction is a synthetic fiber or polyester (as the case may be) and the yarn in the warp is at least 50% synthetic fiber or polyester, i.e. may include as much as 50% other yarns, e.g. cotton.

The pressure-sensitive adhesive layer is preferably a rubber-based adhesive of per se known description, e.g. a natural or synthetic rubbery elastomer. A typical adhesive of this description may include a blend of natural rubber, tackifier and other reagents performing specific desired functions. The selection of the appropriate adhesive will at least in part be dependant upon the particular substrate to which it is to be adhered and in any event will be a matter of individual choice within the expected judgement of the skilled worker. Since the selection of the particular adhesive from those known in the art per se comprises no part of this invention, they need not be discussed in further detail.

The novel tapes of this invention can be assembled by individually producing and sequentially coating the components parts. For example, the backing, tie coat and scrim may be individually supplied by a calendering operation to provide a laminar structure of these three components. An adhesive layer may then be coated onto the cloth substrate by known coating techniques, e.g. calendering, casting, or extrusion.

However, the preferred method of manufacture in accordance with this invention utilizes per se known extrusion techniques wherein the backing and tie coat are coextruded onto the cloth web.

Regardless of the method employed, the polymer melt when applied to the cloth substrate will permeate the interstices of the cloth whereby the cloth fibers may be said to be embedded, at least in part, in the tie coat layer. The subsequently applied adhesive layer will then in part be applied to the cloth fibers and in part be applied to the tie coat in the cloth interstices, thereby providing a strong laminar structure wherein the tie coat is bonded to the backing layer, the cloth and the adhesive material.

As mentioned, the preferred method of manufacture utilizes conventional coextrusion equipment for applying the backing and tie coat to the cloth.

In general, the coextrusion technique employed in the preferred manufacturing process of this invention utilizes two or more extruders, each delivering a single component polymer melt (backing and tie coat) to a combining feedblock which streamlines, combines and feeds the polymers to a single- or multimanifold coat hanger die which in turn feeds the two-layered film into a two roll nip, where a cloth web is fed simultaneously at that point to form the backing/tie coat/scrim laminate. Standard single screw extruders may be employed to melt and pump the individual layers into the coextrusion feedblock or die, as the case may be.

Preferably, the feed pipes connecting the extruders to the feedblock should be kept to the shortest possible length to avoid long residence time which may result in polymer degradation as well as high pressure drop that could cause melt surges.

The dies employed in the extrusion coating applications typically consist of a single- or multimanifold coat hanger design with a tear drop cross section and narrow land length. This design facilitates better control over the thin film thicknesses through gradual and continuous build up of head pressure.

The die is positioned between a steel and a rubber roll for cooling and polishing. The molten polymers are extruded and laminated to the cloth in the nip. For example, one may employ a small diameter (8–10 inch) rubber roll with a 75 shore-D hardness rotating against a large (18–30) steel roll.

Since the coextrusion techniques, as described briefly above are per se well known, such details as barrel and die temperatures, screw speeds and the like will be well understood and any further detailed description is not necessary to the practice of this invention.

The following examples show by way of illustration and not by way of limitation the practice of this invention.

EXAMPLE 1

A 30×16 polyester cloth was employed having 30 polyester yarns per inch warp (understood to be 200 denier, 96 filament) and 16 false-twist yarns per inch of filling, the false-twist yarns being a 50/50 blend of polyester yarns and 30's cotton yarns. The cloth scrim was approximately 4.25 mils thick. Onto this cloth was coextruded (in the manner previously described) a tie coat layer approximately 0.75 mil comprising 95% by weight of ethylene methylacrylate and 5% by weight of black concentrate (for color); and a backing layer approximately 2.0 mils thick comprising the following proportions of ingredients:

|  | Parts by Weight |
| --- | --- |
| CPE | 100 |
| Heat Stabilizers | 3 |
| Antioxidant | 1 |
| Carbon Black Color Concentrate | 2 |

A 2 mil thick layer of B-46 adhesive (trade designation of The Kendall Company for a commercially available pressure-sensitive rubber-based adhesive) was then calendered over the cloth scrim to form the conformable tape.

EXAMPLE 2

Example 1 was repeated, except that the backing layer contained 100 parts by weight of CPE and 20 parts by weight of LDPE.

Since certain changes may be made without departing from the scope of the invention herein described, it is intended that all matter contained in the foregoing description, including examples, shall be taken as illustrative and not in a limiting sense.

What is claimed is:

1. An adhesive tape characterized by having conformability rendering it adaptable for use as a harness wrap or for wrapping other small, irregularly shaped articles, said tape comprising a water-impermeable chlorinated polyethylene backing layer from about 1 to about 3 mils thick carrying, on one side thereof, a fiber woven cloth substantially evenly tearable in the cross direction; an outer pressure sensitive adhesive layer; and a thin tie coat layer positioned between said backing layer and said cloth, said tie coat at least partially filling interstices between fibers of said cloth whereby to be in contact with said adhesive layer, said tie coat providing a strong bond at the tie coat/backing layer interface, the tie coat/cloth interface and the tie/coat/adhesive interface, thereby providing a laminar product further characterized as possessing structural stability and integrity.

2. An adhesive tape as defined in claim 1 wherein said tie coat layer is from about 0.25 to about 1.0 mil thick.

3. An adhesive tape as defined in claim 2 wherein said tie coat comprises ethylene methyl acrylate.

4. An adhesive tape as defined in claim 1 wherein said cloth is a woven cloth comprising a synthetic fiber.

5. An adhesive tape as defined in claim 4 wherein said fiber is a polyester.

6. An adhesive tape as defined in claim 5 wherein the yarn in the filling direction of said cloth contains as much as 50 percent cotton.

7. An adhesive tape as defined in claim 1 wherein said adhesive is a pressure-sensitive adhesive.

8. An adhesive tape as defined in claim 7 wherein said adhesive is a rubber-based adhesive.

9. An adhesive tape characterized by having conformability rendering it adaptable for use as a harness wrap or for wrapping other small, irregularly shaped articles, said tape comprising a water-impermeable chlorinated polyethylene backing layer, said backing layer being from about 1 to about 3 mils thick and carrying on one side thereof a woven polyester cloth substantially evenly tearable in the cross direction; an outer rubber-based pressure sensitive adhesive layer; and a thin tie coat layer positioned between said backing layer and said cloth, said tie coat at least partially filling interstices between fibers of said cloth whereby to physically contact adhesive in said adhesive layer interface, the tie coat/cloth interface and the tie coat/adhesive interface, thereby providing a laminar product further characterized as possessing structural stability and integrity.

10. An adhesive tape as defined in claim 9 wherein said tie coat layer is from about 0.25 to about 1.0 mil thick.

11. An adhesive tape as defined in claim 10 wherein said woven cloth is characterized by having up to 20 false twist yarns per inch in the filling direction and up to 35 yearns per inch warp.

12. An adhesive tape as defined in claim 11 wherein the yarn in the warp of said cloth contains as much as 50 percent cotton.

* * * * *